E. A. DENNIS.
PICNIC AND OTHER FOOD HOLDER.
APPLICATION FILED AUG. 11, 1919.
1,327,948.
Patented Jan. 13, 1920.
2 SHEETS—SHEET 1.
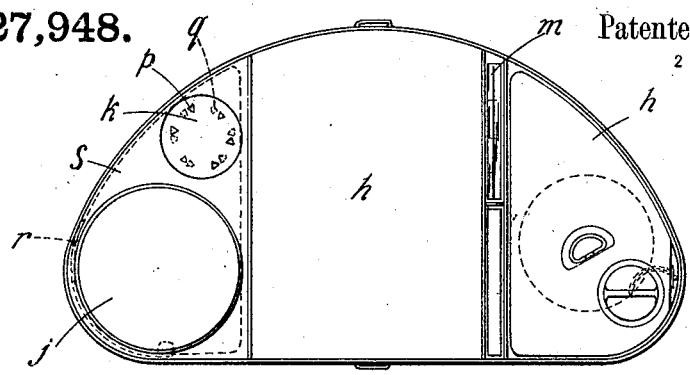
Fig 3.
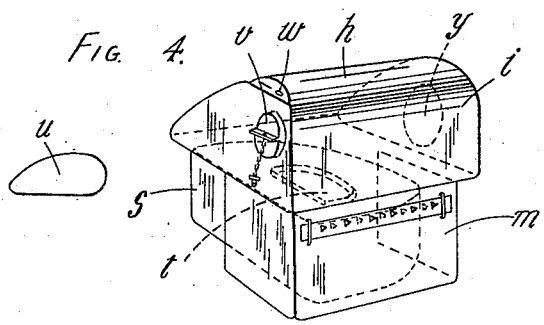
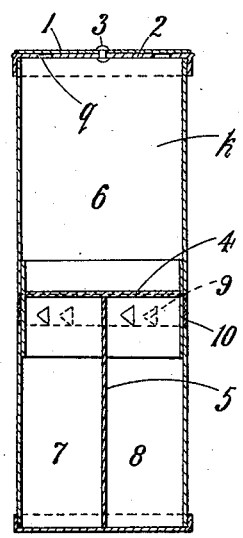
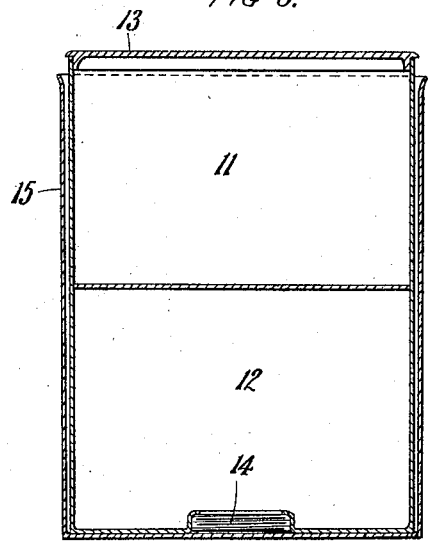
Edward A Dennis INVENTOR E. A. DENNIS.
PICNIC AND OTHER FOOD HOLDER.
APPLICATION FILED AUG. 11, 1919.
1,327,948.
Patented Jan. 13, 1920.
2 SHEETS—SHEET 2.
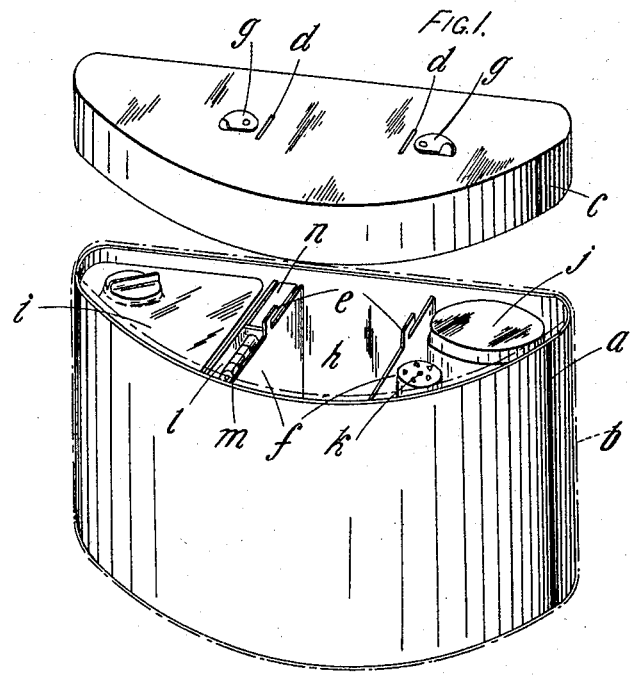
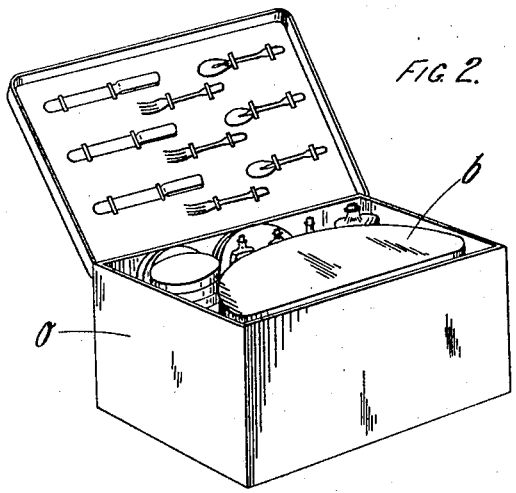
INVENTOR

UNITED STATES PATENT OFFICE.

ERNEST AUGUSTUS DENNIS, OF GLENROY, NEW ZEALAND.

PICNIC AND OTHER FOOD-HOLDER.

1,327,948.  Specification of Letters Patent.  Patented Jan. 13, 1920.

Application filed August 11, 1919. Serial No. 316,818.

*To all whom it may concern:*

Be it known that I, ERNEST AUGUSTUS DENNIS, a citizen of the United Kingdom of Great Britain and Ireland, and residing at Glenroy, Canterbury, New Zealand, have invented certain new and useful Improvements in Picnic and other Food-Holders, of which the following is a specification, such as will enable others skilled in the art to which it appertains to make and use the same.

This invention relates to picnic and other food holders or cruets of the kind provided with removable receptacles for various forms of food stuffs and with which an outer case is used, said outer case preferably being of the kind usually called a mess tin.

Both the cruet and the outer case have covers and according to my invention the cruet which is of substantially D or crescent shape, has a cover provided with rotatable devices for securing it in place. In addition to which it is divided by one or two cross partitions and between the partition and one end, or if two partitions are used, between them and both ends, of the inner case the tins or other receptacles for say sugar, mustard, salt, milk, jam and other such eatables are fitted while a large part of the holder is left as a space for more substantial food stuffs such as meat and bread.

One of the said partitions may be of double form so as to provide a narrow space into which a folding stand and say a narrow receptacle can be fitted. The stand serves as a support and wind screen when a heating stove is used as is hereinafter described.

The said receptacles may be made of any suitable material such as aluminium, enameled iron, china or tin, but I will refer to them as holders or containers.

These holders when used for fine sugar, salt or the like can be in the form of simple tubes with suitable covers or they may be divided into two or more compartments for different articles and in either case be furnished with sprinklers or other openings through which the contents can be shaken out. A preferred form of such opening is made by forming a V-shaped hole in a rotatable cover or it may be in a rotatable band around the tube-like tin adapted to register more or less with a similar opening in the body of the tin so that by turning the cover or band an opening of any size within the full area of the V-shaped hole can be obtained and thus the quantity of sugar, salt or the like discharged can be controlled to a nicety.

Loops may be fixed to the outer case for the attachment of straps and folding handles provided for both the case and the cruet. The outer case with the cruet may form part of a picnic or like hamper or box in which other articles such as cutlery and food stuffs are provided.

Some of the containers in the cruet may be held in place by leaf springs and while the said containers may be of any desired shape it is advantageous to shape some of them to fit close to the curved inside ends of the cruet.

A beverage vessel and a stove for heating same are supplied. The said vessel may have three openings one at one end for filling and emptying, one at the other end for cleaning, and a small one for the escape of steam when the vessel is being heated, and if the vessel is of large size a draw-off tap may be used.

The beverage vessel is preferably fitted into the cruet on the side next to the double partition which tends to thermally insulate it from the central opening and packing or felt may be fitted into the cruet to form a heat retaining nest for the vessel.

In the accompanying drawings:—

Figure 1 is a perspective view of one of my cruets with its cover removed, the said cruet being fitted within an outer case of the mess tin type and which is indicated by line and dot.

Fig. 2 shows on smaller scale a mess tin or outer case, holding one of my cruets as seen in Fig. 1, fitted into an ordinary picnic or camping-out basket.

Fig. 3 is a top or plan view of the cruet.

Fig. 4 shows, on reduced scale, the beverage container, stove and screen used for heating the beverage.

Fig. 5 shows a container for fine or powdered substances and

Fig. 6 illustrates a food container divided about centrally and fitted within a cup or tin which may be used for any useful purposes such as for drinking.

Referring to Fig. 1, the cruet $a$ is a close fit in the mess tin $b$ and has a cover $c$ in which are openings $d$ designed to fit over the hooks $e$ on partitions $f$ inside the cruet. Close to the openings $d$ rotatable catches $g$ are provided and adapted to engage the hooks $e$ to hold the cover down. The partitions f divide the cruet into three main compartments of which the central one h may be employed for holding food stuffs such as bread, cheese and meats, while the other compartments have fitted into them the beverage vessel i and tins or pots j and k. One of the partitions is of double form as shown at l and has fitted into it a folding stand m and a narrow container n. The said stand is shown on a smaller scale in Fig. 4 and the container n may be employed to hold any suitable substances.

In Fig. 2 the mess tin b only is seen but it is here fitted into a picnic case o of substantially known kind.

Fig. 3 is a plan view of the cruet shown in Fig. 1 and like reference letters are used for similar parts but in this case the top of the tin k is shown more clearly and it will be seen it is provided with triangular openings p and q which can be brought into register for the purpose of shaking out the contents in such variable quantities as may be desired. This same drawing illustrates leaf springs r fitted to the inside of the cruet for the purpose of holding the stove s in position.

Fig. 4 shows the stand m extended and supporting the beverage container i under which a stove s is placed. This stove has a wedge like opening t which may be closed by the cap u shown on one side of Fig. 4. In the vessel h a filling and emptying hole is provided at v, a vent at w and a cleaning hole at y.

Fig. 5 shows the tin k on a larger scale and illustrates a double cover 1—2 in which the openings p and q respectively occur. These two parts are pivotally attached together at 3 so that the upper part 1 can be rotated on the lower part 2.

A partition 4 centrally divides the tin and another partition 5 sub-divides it so that compartments 6, 7 and 8 are formed. The upper end of the compartment 7 has in it V-shaped openings 9 which can be caused to register more or less with similar openings in a rotatable band 10 so that the contents of 7 can be variable shaken out to suit the user.

In Fig. 6 the vessel shown comprises two compartments 11—12 the upper of which is closed with a cover 13 while the lower is adapted to receive a screw cap at 14. This vessel fits within a tin or pot 15 which may be employed for any useful purpose such as for drinking.

What I claim and desire to secure by Letters Patent is:—

A cruet for picnic, camping and like purposes comprising a substantially D-shaped receptacle, partitions transversely of the receptacle dividing the same into compartments for receptacles, a D-shaped receptacle in a similarly shaped compartment at one end of the first mentioned receptacle, means bearing against the side of the second mentioned D-shaped receptacle for holding it in position and a cover for the first mentioned receptacle.

In witness whereof I have hereunto set my hand in presence of two witnesses.

ERNEST AUGUSTUS DENNIS.

Witnesses:
  HENRY FAIRBROTHER,
  JAMES THOMSON.